2,972,556
Patented Feb. 21, 1961

2,972,556

COMPOSITE COATED CARBONACEOUS ARTICLE AND PROCESS OF MAKING THE SAME

Peter Vrahiotes, Fostoria, and Matthew B. Manofsky, Oakharbor, Ohio, assignors to Union Carbide Corporation, a corporation of New York No Drawing. Filed Dec. 9, 1958, Ser. No. 779,060

12 Claims. (Cl. 117—106)

This invention relates to carbon or graphite articles having surface portions protected against erosion and oxidation by a "composite" coating of metal carbide and metal nitride. The invention also relates to a process of preparing such articles.

Carbon and graphite articles have exceptionally good thermal and electrical properties. However, in certain applications it is necessary to protect such articles from erosion and oxidation caused by high temperature, high velocity streams of oxidizing gas such as air. This is of particular importance in the field of missile and rocket nose cones and nozzles which must withstand extremely high velocity flow of oxidizing gases at elevated temperatures.

Although many attempts have been made in the past to provide this protection, none have as yet been completely successful in providing the degree of protection required by modern day rocket technology. Of the various types of protection given to carbon or graphite articles in the past, coating or impregnating with either carbides or nitrides have been the most successful though these still have fallen short of the desired mark in that none of the prior devices were able to withstand fluid velocities approximating five times the speed of sound at temperatures ranging up to several thousand degrees.

It is therefore the primary object of this invention to provide an article which will substantially maintain its dimensional stability under the action of high temperature, high velocity oxidizing fluids.

Another object of this invention is to provide an article which is substantially resistant to oxidation and erosion by high temperature, high velocity oxidizing fluids.

Still another object of this invention is to provide a refractory article having a relatively inert refractory coating which will be substantially unaffected by the action of high temperature, high velocity streams of oxidizing fluids.

A further object of this invention is to provide a novel process for applying a metal carbide-metal nitride composite coating onto a carbonaceous article.

A still further object of this invention is to provide such a process wherein such a coating may be applied in a single operation.

In accord with and fulfilling these objects, the article of the invention comprises a carbon or graphite core having a composite metal nitride-metal carbide coating on the surface and in the adjoining surface pores thereof. More particularly, the composite coating may suitably be formed of carbide-nitride composites of silicon, titanium, zirconium, or any other metal which forms refractory nitrides and carbides. The most important factors to be taken into consideration when determining the particular metal to be used in providing a composite coating on the carbon or graphite article are that the metal be both carbide and nitride forming, that the carbide-forming compounds will adhere to the carbonaceous article, and that the composite thereby formed is refractory. Taking these factors into account, the above-mentioned metals all perform adequately; however, it is obvious that many other metals will similarly perform the same function and the application of any of those as would be suitable according to the above standards by those skilled in the art is intended to be part of this invention.

The article of the invention may be produced by bringing the carbon or graphite article to be coated to a carbide forming temperature in the presence of a metal, the qualifications of which have been described above. At this carbide forming temperature, at least part of the metal is vaporized and it reacts with the carbonaceous article to provide some amount of metal carbide on the surface and in the pores of the article being coated, together with a deposit of some of the metal in the unreacted state. It is important to the proper operation of this process that the atmosphere surrounding the article being coated be non-oxidizing. This condition is best provided for by blanketing the article and metal with an inert gas, such as those selected from group VIII of the periodic table (helium, neon, argon, krypton, xenon, and radon).

Before the carbonaceous article is fully coated with metal carbide, the inert gas-metal vapor atmosphere is diluted by introducing a nitrogenous substance into it. Suitably, the nitrogenous substance may be pure nitrogen gas, ammonia, or any other available material or combination of materials having like characteristics. While we do not wish to be bound by any particular coating and reaction mechanism, it is believed that at least some of the nitrogen in the nitrogenous atmosphere reacts with the unreacted metal which was deposited on the carbonaceous article during the carbiding stage and that some of the nitrogen goes through a vapor phase reaction with a portion of the metal vapor present in the atmosphere with the resulting metal nitride depositing on the carbonaceous article. In any case, whatever the reaction and deposition mechanism may be, at the end of the nitriding phase, the article is cooled to room temperature whereupon the composite coated article is ready for use.

It is to be noted that the process broadly referred to above is a one step operation, that is the composite coating is applied by varying temperature and atmosphere at the proper time. It is obvious that the slightly more tedious method of first forming a metal carbide coating on the carbonaceous article, cooling it to room temperature, and then effecting the nitriding procedure in a second distinct step is well within the scope of the present invention and there may be situations where such a procedure would be advantageously followed.

Of course, in either the one step or two step processes, the temperature of the furnace and the hold-time are dependent upon the bulk of the article being coated. This is so since it is necessary to allow the article itself to come to a carbiding and a nitriding temperature. If the article has a large bulk, it will normally take a higher furnace temperature or a longer temperature hold-time for the article to come to the proper temperature. Thus, in the case of silicon composite coatings, the hold-time for bringing the article to a 2200° C. carbiding temperature may range from one and one-half hours to three hours.

As may be noted from the above description of the process of making a composite coated article, the apparatus necessary for providing the composite coating is very simple indeed. The article core and the metal are held in an air-tight container having inlet and exhaust ports to facilitate varying the atmosphere inside. It is not essential that the article and the metal be in contact initially. In fact, though the process will work if they are in contact, it has been found advantageous to keep the article and the solid metal apart and leave the entire coating to vapor phase deposition and reaction because closer dimensional tolerance and smoother coatings result. Heating of the article may suitably be accomplished by inserting the container into a furnace, preferably one which has a heating well adapted to the receipt of the container. Temperature control may be provided by means of optical pyrometers, thermocouples or any other convenient means adapted to the particular heating system and temperature range utilized.

The following may be cited as a specific example of the process of this invention resulting in an article having superior erosion and oxidation-resistant characteristics than have formerly been available. A graphite cone was placed in an enclosed crucible on graphite knife edges and a bed of finely-divided silicon metal in a proportion of one pound of silicon per 100 square inches of graphite surface was placed under the knife edges. The air in the crucible was evacuated and replaced by argon in order to insure a non-oxidizing, non-nitriding atmosphere. Power was applied for about one hour, thus raising the temperature to about 1200° C., and held at this point for about one and one-half additional hours to allow the furnace and furnace charge to reach temperature equilibrium before melting of the silicon was initiated. The power was raised for one and one-half hours to bring the temperature up to 2200° C. and was held there for another one and one-half hours. The metal was partially vaporized and deposited in the pores and on the surface of the graphite article and was converted to the carbide during this heating period The power was then turned off and the crucible allowed to cool for two and a half hours to 1650° C. The argon and silicon atmosphere remaining was diluted with nitrogen while the crucible was cooling for the next five hours to 1200° C. The nitrogen was then turned off, the crucible cooled to room temperature and the composite coated article was removed.

Graphite rocket nozzles having a silicon carbide-silicon nitride composite coating in accord with this invention have been tested and the results obtained compared with data taken from similar tests run on uncoated and carbide coated nozzles of the same size and shape. The tests were conducted by fitting the nozzle in question into a rocket engine, igniting the engine, thus producing a nozzle velocity of about 5,000 feet per second of effluent gases (mostly products of combustion of kerosene and oxygen) at about 5200° F., and measuring the time it took for the combustion chamber pressure to drop 5 percent. The combustion chamber pressure drop was caused by the effluent gases eroding the nozzle thereby enlarging the nozzle orifice and reducing the internal pressure. Table I, below, is a composite of data taken from tests as described above. The two graphite designations, A and B, refer to different grades of graphite used to make the subsequently coated nozzles ("A" is a coarse grade of graphite having a strength of about half that of the "B" grade which is fine grain stock). The variations in the "life" of each type of graphite cored nozzle is to a great extent dependent upon the particular type of graphite used as core material. The table shows that graphite B is a better material for resisting oxidation and erosion than is graphite A even with no coating, and thus it follows that the increased protection afforded by the composite coating is an added measure of protection over the inherent life of the core. In reviewing the table, it is important that comparisons of "life" should be made between nozzles utilizing the same type graphite as a core.

*Table I*

| Material | Treatment | Average life (sec.) |
|---|---|---|
| Graphite A | none | 3.1 |
| Graphite B | do | 14.2 |
| Graphite A | SiC coating | 24.7 |
| Graphite B | do | 65.4 |
| Graphite A | two step composite coating | 48.1 |
| Do | one step composite coating | 60.2 |
| Graphite B | do | 78.4 |

A review of the data presented in Table I shows that a graphite nozzle which has a composite coating thereon has between 6 and 20 times longer life depending upon the type of graphite core used. In addition, composite coated articles have between 20% and 150% longer life than do the same graphite cored nozzles protected by only a silicon carbide coating.

It is to be understood of course that both zirconium and titanium as well as other carbide and nitride forming metals may be used to advantage in conjunction with this invention. The same method of application as above described would be applicable with the only change necessary being a variation in the temperatures used in accord with the carbide-forming and nitride-forming temperatures of any given metal. It is to be noted, however, that care should be exercised when coating with these more active metal composites. The nitrogenous atmosphere should be introduced slowly so as to reduce the hazard of rapid reaction.

What is claimed is:

1. A process of forming a composite metal carbide-metal nitride coating on a carbonaceous article which comprises blanketing said article with a non-nitriding, inert atmosphere, placing metal to be coated in proximity to said article, heating said metal to a carbide-forming temperature, said temperature being sufficient to maintain a partial vapor pressure of said metal, maintaining such temperature for a sufficient time to react at least a portion of said metal with said article and to deposit some of said metal unreacted into the pores of said article, bringing said article to a temperature sufficient to cause formation of a nitride, providing a nitrogenous atmosphere adjacent said article, and cooling said article to room temperature.

2. A process of forming a composite metal carbide-metal nitride coating on a carbonaceous article which comprises placing said article in an enclosed crucible, disposing at least one metal selected from the group consisting of titanium, silicon and zirconium in said crucible, filling said crucible with an inert atmosphere, heating said crucible to a carbide-forming temperature, said temperature benig sufficient to maintain a partial vapor pressure of said metal, maintaining such temperature for a sufficient time to react at least a portion of said metal with said article and to deposit some of said metal unreacted into the pores of said article, bringing said crucible to a nitride-forming temperature, introducing a nitrogenous atmosphere into said crucible, and cooling said crucible to room temperature.

3. A process of forming a composite metal carbide-metal nitride coating on a graphite article which comprises placing said article in an air tight crucible, disposing at least one metal selected from the group consisting of titanium, silicon, and zirconium in said crucible, filling said crucible with an argon atmosphere, heating said crucible to a carbide-forming temperature, said temperature being sufficient to maintain a partial vapor pressure of said metal, maintaining such temperature for a sufficient time to react at least a portion of said metal with said article and to deposit some of said metal unreacted into the pores of said article, bringing said crucible to a nitride-forming temperature, introducing a nitrogen atmosphere into said crucible, and cooling said article to room temperature.

4. A process of forming a composite silicon carbide-silicon nitride coating on a graphite article which comprises placing said article in an enclosed crucible, disposing silicon metal in said crucible, filling said crucible with an inert atmosphere, heating said crucible to a carbide-forming temperature above the melting point of silicon, maintaining such temperature for a sufficient time to react at least a portion of said silicon with said article and to deposit some of said silicon unreacted into the pores of said article, bringing said crucible to a nitride-forming temperature, introducing a nitrogenous atmosphere into said crucible, and cooling said article to room temperature.

5. A process of forming a composite titanium carbide-titanium nitride coating on a graphite article which comprises placing said article in an enclosed crucible, disposing titanium metal in said crucible, filling said crucible with an inert atmosphere, heating said crucible to a carbide-forming temperature above the melting point of titanium, maintaining such temperature for a sufficient time to react at least a portion of said titanium with said article and to deposit some of said titanium unreacted into the pores of said article, bringing said crucible to a nitride-forming temperature, introducing a nitrogenous atmosphere into said crucible, and cooling said crucible to room temperature.

6. A process of forming a composite zirconium carbide-zirconium nitride coating on a graphite article which comprises placing said article in an enclosed crucible, disposing zirconium metal in said crucible, filling said crucible with an inert atmosphere, heating said crucible to a carbide-forming temperature above the melting point of zirconium, maintaining such temperature for a sufficient time to react at least a portion of said zirconium with said article and to deposit some of said zirconium unreacted into the pores of said article, bringing said crucible to a nitride-forming temperature, introducing a nitrogenous atmosphere into said crucible, and cooling said article to room temperature.

7. A process of forming a composite silicon carbide-silicon nitride coating on a graphite article which comprises placing said article in an enclosed crucible, disposing silicon metal below said article in said crucible, filling said crucible with an argon atmosphere, heating said article to about 2150° C. to 2250° C., holding such temperature for between 75 and 105 minutes, cooling said article to about 1650° C., introducing nitrogen to said crucible, allowing said article to cool for about 240 to 300 minutes to about 1200° C., and allowing said article to cool to room temperature.

8. A carbonaceous article having a composite metal carbide-metal nitride coating on the surface and in the pores thereof, said coating rendering said article substantially unaffected by erosion and oxidation of high temperature, high velocity, oxidizing fluids.

9. A carbonaceous article having a composite coating consisting of a carbide and a nitride of at least one member of the group consisting of silicon, titanium, and zirconium, said coating being disposed on the surface and in the pores of said carbonaceous article, said coating rendering said article substantially resistant to the erosion and oxidation action of oxidizing fluids at high temperatures and high velocities.

10. A carbonaceous article having a composite silicon carbide-silicon nitride coating on the surface and in the pores thereof, said coating rendering said article substantially resistant to the erosion and oxidation action of high temperature, high velocity, oxidizing fluids.

11. A carbonaceous article having a composite titanium carbide-titanium nitride coating on the surface and in the pores thereof, said coating rendering said article substantially resistant to the erosion and oxidation action of oxidizing fluids at high temperatures and high velocities.

12. A carbonaceous article having a composite zirconium carbide-zirconium nitride coating on the surface and in the pores thereof, said coating rendering said article substantially resistant to the erosion and oxidation action of oxidizing fluids at high temperatures and high velocities.

References Cited in the file of this patent

UNITED STATES PATENTS

| | | |
|---|---|---|
| 876,332 | Clark | Jan. 14, 1908 |
| 1,312,262 | King | Aug. 5, 1919 |
| 1,982,012 | Mingard | Nov. 27, 1934 |
| 2,719,094 | Clough et al. | Sept. 27, 1955 |
| 2,859,139 | Ramadanoff | Nov. 4, 1958 |
| 2,866,724 | Alexander | Dec. 30, 1958 |